United States Patent [19]

Coel et al.

[11] 4,126,338
[45] Nov. 21, 1978

[54] THREADED COUPLING

[75] Inventors: Joseph B. Coel, Menomonee Falls; Donald D. Jablonski, Germantown; Edward A. Seruga, Milwaukee, all of Wis.

[73] Assignee: Badger Meter, Inc., Milwaukee, Wis.

[21] Appl. No.: 611,980

[22] Filed: Sep. 10, 1975

Related U.S. Application Data

[63] Continuation of Ser. No. 463,544, Apr. 24, 1974.

[51] Int. Cl.² .............................................. F16L 25/00
[52] U.S. Cl. ........................................ 285/330; 85/46; 85/83; 285/354; 285/392; 285/423
[58] Field of Search ........... 285/330, 21, 423, DIG. 4, 285/222, 238, 349, 355, 390, 39, 354, 392; 85/46, 83; 403/343

[56] References Cited

U.S. PATENT DOCUMENTS

| | | | |
|---|---|---|---|
| 1,574,052 | 2/1926 | Mueller | 285/330 X |
| 1,832,713 | 11/1931 | Leinow | 285/355 |
| 2,165,621 | 7/1939 | Donahue et al. | 285/222 X |
| 2,315,792 | 4/1943 | Hoss | 285/330 X |
| 2,403,810 | 7/1946 | Lord | 85/83 |
| 2,464,744 | 3/1949 | Fennema | 285/330 |
| 2,477,969 | 8/1949 | Donner | 285/330 X |
| 2,876,154 | 3/1959 | Usos | 285/238 X |
| 2,954,246 | 9/1960 | Totoh et al. | 285/349 X |
| 3,646,981 | 3/1972 | Barnes | 85/46 |
| 3,695,643 | 10/1972 | Schmunk | 285/DIG. 4 |

FOREIGN PATENT DOCUMENTS 152,083  6/1950  Australia .................................. 285/423

Primary Examiner—Dave W. Arola
Attorney, Agent, or Firm—Neuman, Williams, Anderson & Olson

[57] ABSTRACT

A threaded coupling in which the connecting threads are carried on a replaceable sleeve which snap locks onto the end of the primary member such that the thread unit may easily be assembled on or removed from the primary member and replaced when worn or damaged.

16 Claims, 6 Drawing Figures

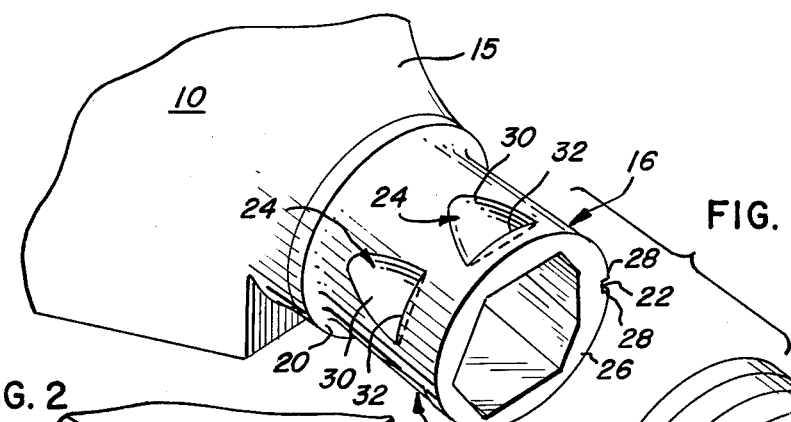
FIG. 1
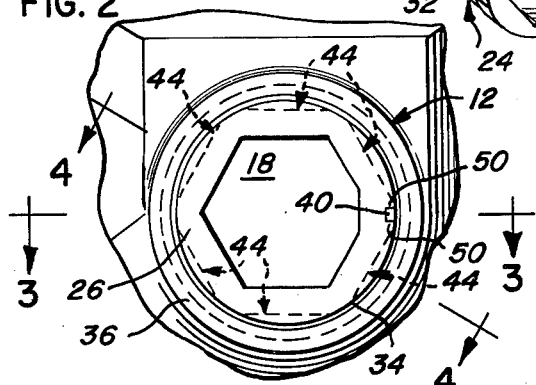
FIG. 2
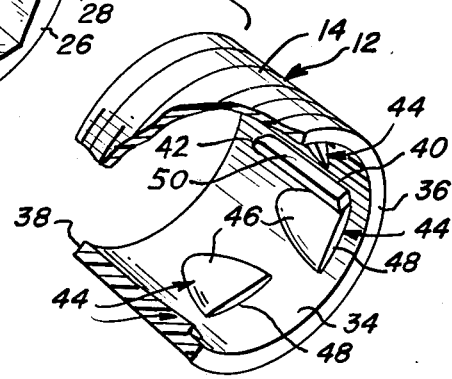
FIG. 6
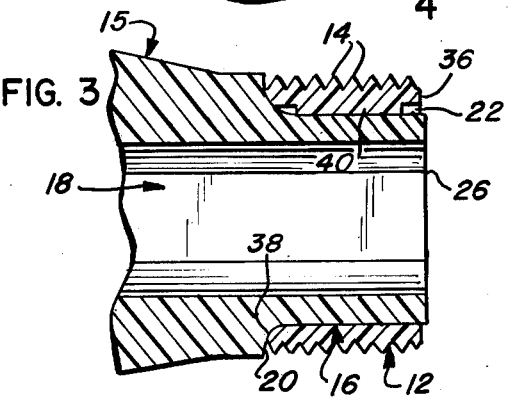
FIG. 3
FIG. 4
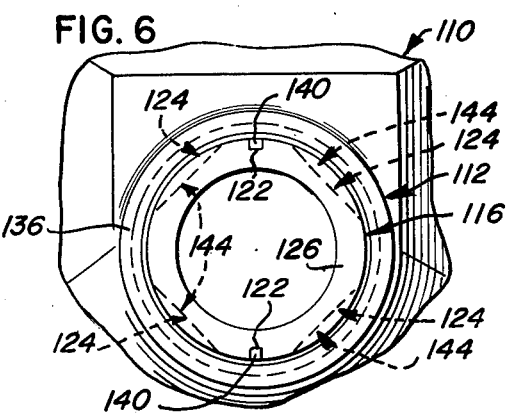
FIG. 5

THREADED COUPLING

This is a continuation of application Ser. No. 463,544 filed Apr. 24, 1974.

This invention relates to a threaded connector and more specifically to a threaded connector assembly including a replaceable set of threads in which the threads are securely held in a manner to permit conventional threading engagement of the connector with other elements and are easily and conveniently replaceable in the event the threaded element has to be changed. The replaceable threaded connector is mounted on the end of a primary member by mating sliding engagement, such that the threaded connector will not rotate about or translate in an axial direction off of the primary member.

Various proposals have been made heretofore for attaching various threaded connectors to a primary member. Such connectors tend to be permanent in that the threaded elements are not readily replaceable. More specifically, it is known to secure an independent set of threads on a primary component by an interference fit, by another set of threads or by bonding. The prior Erickson U.S. Pat. No. 1,378,015, Wallace No. 1,953,665, Donahue et al. No. 2,165,621, Donahue No. 2,165,622, Martin No. 2,374,763 and McKenna No. 2,955,847 show specific examples of so attaching a variety of threaded members.

There remains a need for replaceable threads that can be removed and replaced with ordinary tools and without damaging the primary member. Moreover, it is desirable that no complex equipment be required for forming a joint between the primary member and the threaded connector or that any involved techniques be needed for replacing the threaded connector. Further, the arrangement must provide for obtaining a satisfactory functional joint or connection between the joined primary members.

Previous threaded members have failed to include desirable features which allow the easy replacement and inexpensive manufacture of the threaded sleeve and cooperative snap locking means of this invention.

It is an object of the subject invention to overcome the disadvantages and complexities incurred with the use of the prior art devices.

It is an object of this invention to provide an improved threaded connector assembly with a replaceable threaded element.

It is a more specific object of this invention to provide an improved replaceable threaded connector which locks onto a primary member thereby preventing rotation or axial translation of the threaded connector with respect to said member.

It is another object of the present invention to provide a replaceable threaded connector which may be removed easily.

It is a further object of this invention to provide a replaceable threaded member which can be installed and removed with ordinary hand tools.

It is yet another object of the present invention to provide threads which will yield when the connector assembly is overstressed such that any failures or the need for replacement will be readily apparent.

Additional objects and advantages of the present invention will become apparent as the following description proceeds and the features of novelty which characterize this invention are pointed out with particularity in the claims annexed to and forming a part of this specification.

In carrying out the invention in one embodiment, a replaceable threaded sleeve is provided for mating sliding engagement with a primary member in a manner to prevent rotation or axial translation of the threaded sleeve relative to the primary member. A spline connection comprises a rib which extends radially inwardly from the inside wall of the sleeve to slide in a corresponding recess in the mating end of the primary member. The threaded sleeve also has several inwardly sloping wedges protruding from its inside wall for camming over the end of the primary member and engaging with corresponding recesses provided on the end of the primary member. The sleeve is sufficiently resilient to allow the camming wedges to slide over the primary member and to snap into the companion recesses on the primary member without permanent deformation of either. Since the camming wedges prevent axial translation only off the primary member there is a shoulder on the primary member just aft of where the threaded sleeve rests to prevent any inward axial translation of the sleeve. For removal, the sleeve can be severed or split along an axially disposed line so that it may be expanded and removed.

For a more complete understanding of this invention, reference should now be had to the illustrative embodiments shown in greater detail in the accompanying drawing and described below by way of an example of the invention.

In the drawing:

FIG. 1 is an exploded perspective view, partially cut away for illustrative purposes, of a threaded sleeve and mating housing end to which the sleeve can be assembled, and employing teachings of this invention;

FIG. 2 is an end elevational view of the assembly of a housing and a threaded sleeve;

FIG. 3 is a sectional view taken along line 3—3 of FIG. 2;

FIG. 4 is a sectional view taken along line 4—4 of FIG. 2;

FIG. 5 is a partial sectional view similar to that shown in FIG. 3, with a coupling nut and a conduit joined to the assembled housing and threaded sleeve forming a fluid conducting sealed joint; and FIG. 6 is an end elevational view similar to FIG. 2 of another embodiment utilizing a different number and arrangement of the locking elements.

The improvement herein and as illustrated in FIG. 1 consists of two cooperating components comprising a housing 10 and a replaceable threaded sleeve 12, which are shown unassembled in FIG. 1. The technique by which the housing 10 and the threaded sleeve 12 are coupled such that no relative movement between them is permitted will be explained in detail in this specification. In general, there are protuberances on the inside of the sleeve 12 which are arranged to engage corresponding recesses on the housing 10. Suitable threads 14 are provided circumferentially about the outside of sleeve 12 for coupling with a fluid conduit.

The housing 10 includes a central portion 15 and an end portion or spud 16 which is the part to which the threaded sleeve 12 is assembled. A fluid passageway 18 in the housing 10 (see FIGS. 2, 3, 4 and 5), extends from the central portion 15 through the spud 16. On the outside of housing 10 at the intersection of spud 16 and central portion 15 there is a shoulder 20 formed by the termination of the housing central portion 15 which is larger than the spud 16.

Spud 16 is generally cylindrical and, for the purpose of sliding mating engagement with the sleeve 12, has the aforementioned recesses which are of two basic types. The recesses are an elongated axially extending keyway 22 and locking recesses 24. Both are used in preventing rotation of the sleeve 12 on spud 16 while the latter are used in restraining axial translation of the sleeve 12 from the spud 16. The keyway 22 extends from the distal face 26 of spud 16 to the shoulder 20. The side walls 28 of keyway 22 resist rotation of the sleeve 12 when it is assembled on the spud 16. Each locking recess 24 has a sloping planar bottom surface 30 and an end wall 32 which extends normal to the longitudinal axis of the spud 16, see FIG. 4. The sloping bottoms 30 converge toward the central axis of the spud 16 in a direction outward from the body 14. Accordingly, each sloping bottom 30 is depressed to a greater extent at its juncture with end wall 32 which is closer to distal face 26. Six locking recesses 24 are shown in FIG. 3 and are positioned at 60° intervals about spud 16. Each recess is offset longitudinally of the spud relative to the two circumferentially adjacent recesses, such that these recesses are alternately staggered as shown. The end walls 32 prevent outward axial translation of sleeve 12 when it is assembled to spud 16.

Threaded sleeve 12 includes companion or mating protuberances for cooperating with the keyway 22 and recesses 24 in spud 16 when they are assembled to one another. Inside wall 34 of sleeve 12 is sized and shaped to have a longitudinal (coaxial) sliding fit about spud 16; both are generally cylindrical and the inside diameter of the sleeve 12 is roughly equivalent to the outside diameter of the spud 16. Sleeve 12 has an outward distal end face 36, and an inward distal end face 38 which is chamfered at its inner edge to facilitate assembly of the sleeve 12 upon the spud 16.

An axially extending rib 40 is provided on the inside wall 34 and is shaped to slide into keyway 22 when the sleeve 12 is aligned with spud 16 as in FIG. 1. While spud 16 and threaded sleeve 12 have substantially the same axial length, the rib 40 does not extend from inward distal face 38 to outward distal face 36 but terminates a short distance from each. Consequently, any tolerances, flash, shrinkage or sink mark problems will not hamper the full insertion of sleeve 12 on spud 16. The inward or lead edge 42 of rib 40 is curved as shown in FIG. 1 to further facilitate assembly of the two components.

Locking wedge protuberances 44 extend from the inside wall 34 and are shaped to nest in locking recesses 24 when the sleeve 12 is assembled upon the spud 16. Therefore, there are six such locking wedges 44 which are staggered longitudinally and spaced 60° apart circumferentially of the sleeve in the same pattern as recesses 24. The wedges 44 also are positioned relative to rib 40 and outward distal face 36 similar to the positions of the locking recesses 24 relative to keyway 22 and distal face 26. Thus, when the rib 40 is aligned with and inserted in keyway 22, locking wedges 44 also are aligned with locking recesses 24. Each locking wedge 44 has an inward sloping ramp 46 terminating at a radially disposed outer end wall 48, see FIGS. 1 and 4, whereby each ramp 46 conforms generally to the respective recess bottom 30 and its end wall surface 48 seats against the respective recess end wall 32 when sleeve 12 is assembled to spud 16 as shown in FIG. 3. Each illustrated ramp 46 is planar and extends from the cylindrical sleeve wall surface 34 to the respective abutment wall 48, thereby having a parabolic line of intersection with the sleeve wall in plan view as seen in FIG. 1.

As already explained, the cooperating protuberances and recesses are positioned to align with one another so they mate when assembled. It will be noted that the ramps 46 are located nearer the outward distal face 36. Accordingly, if the sleeve 12 is inserted over the spud 16 with the outward face 36 positioned toward shoulder 20, the terminating walls 48 immediately abut distal faces 26 of spud 16 and prevent insertion or even engagement of rib 40 with keyway 22. Therefore, the orientation error is readily apparent and the construction is fail safe since complete assembly can only be made by the proper orientation and alignment of sleeve 12 with respect to spud 16.

The replaceable threaded sleeve 12 is of a resilient material and design such that it can be readily installed on the spud 16 by simply placing the threaded sleeve 12 on the spud 16 in the proper orientation so that the rib 40 of the threaded sleeve is engaged in the keyway 22 of the spud 16, and then forcing the parts into juxtaposition with one another by means of a push or a sharp blow. As this assembly is being accomplished, the cam engagement of ramps 46 of the threaded sleeve 12 with the outer surface of spud 16 causes a circumferential elastic elongation or expansion of the sleeve 12 until the wedges 44 snap into the locking recesses 24 of the spud 16, whereupon the sleeve 12 returns to its fitted mating configuration and size. Thereafter, a firm axial locking abutment is effected between the walls 48 of the threaded sleeve 12 and the corresponding end walls 32 of the spud 16. This feature retains the threaded sleeve 12 on the spud 16 against axial outward forces applied to the threads 14 to prevent axial removal movement of the sleeve 12 from the spud 16 in use. Simultaneously, the rib 40 engaged in the keyway 22 prevents relative rotation of the sleeve 12, such as when other plumbing elements are connected by threading onto sleeve 12. Thus, keyway side walls 28 abut similar side walls 50 on ribs 40 and assume torque loads imposed upon sleeve 12. Engagement of the planar ramp surfaces 46 with the planar bottom surfaces 30 also provides torque transfer and assists in preventing rotation of the sleeve 12 about the spud 16, due to the mating noncircular, effectively polygonal configuration of these surfaces collectively, see FIG. 2. Inward distal face 38 seats against shoulder 20 to prevent inward axial translation of the sleeve 12 upon spud 16.

In the act of making a connection or successive connections between an external coupling element such as a union nut 54 (see FIG. 5) and the threads 14, the threads inadvertently may become cross-threaded, stripped, worn or damaged in other ways. The risk of such damage is enhanced where the threads are of a plastic material. If any such damage occurs to the threads, the entire threaded sleeve 12 can be removed and simply replaced with a new threaded sleeve 12, thereby eliminating the necessity of replacing the entire housing 10. Accordingly, this invention is particularly beneficial in applications where a relatively complex or costly component is to have threaded connections with other components.

It has been found that a polymeric material such as nylon has adequate resilience to incur the circumferential elongation required of sleeve 12 during assembly without suffering permanent deformation. In addition, such material has adequate strength to permit drawing another component such as a fluid conduit 52 into an abutting fluid seal relationship with the outer end of spud 16, as shown in FIG. 5.

The fluid conduit 52 has an annular flange 58 at one end. The flange 58 is engaged by an annular shoulder 62 on the nut 54 as the retaining nut 54 is threaded onto sleeve 12, in the general manner of a union-type plumbing connection. The distance between terminating walls 48 and outward face 36 is slightly less than the distance between recess end walls 32 and distal face 26 such that as nut 54 is tightened annular flange 58 is brought to bear against a sealing washer 64 interposed between distal face 26 and flange 58. The abutment of shoulders 32 and 48 provide axial force transfer from the sleeve 12 to the spud 16 for effecting the described sealed joint connection between the spud 16 and the conduit 52, notwithstanding the axial loads imposed upon sleeve 12. Moreover, the sleeve 12 inherently is confined radially by the mating nut 54 when a connecting joint is effected, which precludes radial expansion of the sleeve 12 and thereby insures that the mating engagement of surfaces 32 and 48 and the circumferential interference of surfaces 30 and 46 will be maintained despite the imposed stress conditions.

One specific example of a particularly beneficial application of this invention is in a water meter having a unitary plastic housing, such as the Recordall meters sold by Badger Meter, Inc. of Milwaukee, Wisconsin. Therein the housing 10 is the main housing for a water meter and is molded from a glass reinforced polymeric substance such as a polycarbonate. The connecting threads heretofore have been molded integral with the spuds. However, wherever the threads were damaged or otherwise defective, replacement of the entire housing molding was required. With the present invention, only the threaded sleeve 12 need be replaced. Similarly, with the present invention, threads may be provided for connecting a standard primary element such as a meter housing 10 with other components of various thread diameters, standards and pitches by simply substituting a sleeve 12 having the appropriate threads thereon. The material of the housing 10, having glass reinforcement, is stronger than the material of the sleeve 12 whereby the sleeve will deform before the housing. The replaceable threaded sleeve 12 therefore also is fail safe in preventing damage to the housing 10 which is relatively much more expensive to manufacture. In order to remove a damaged sleeve, an axially extending cut, preferably parallel to the rib 40, will allow the sleeve to be opened and removed. To assure complete safety during the removal of a damaged sleeve the splitting or cutting tool easily may be applied to cut only the material of the sleeve and not the material of the housing 10.

Another advantage of having a polymeric replaceable sleeve 12 is its lubricative and insulative properties. That is to say, the polymeric materials will not corrode even under galvanic conditions such as when the housing 10 and the fluid conduit 52 are of dissimilar metals and the fluid is an electrolyte. Even after years of such service a coupling between nut 54 and sleeve 12 will be relatively easy to disconnect. In FIG. 5 nut 54 is shown with hole 66 which is included for the purpose of wire-locking nut 54 in position when the improvement is used in connection with a water meter, for it is common practice to wire the nuts at both ends of water meters and seal the end of the wire to prevent unauthorized tampering.

A specific example of a water meter replaceable threaded coupling in accordance with FIGS. 1–5 which has been found to be an operative arrangement has a sleeve 12 molded of type 66 nylon, with a 1.036" O.D. of the threads and a 0.852" I.D. The sleeve is about ⅞" in length, and is formed with ¾"-14 NPSM Special straight pipe external threads. Each rib 40 is about 0.050" wide, 0.035" high and 0.41" long. Each wedge 44 is about 0.227" long and has a ramp surface 46 at an angle of about 10° to the axis of the spud and a terminating wall 48 whose maximum height is about 0.040". The primary member is a spud on a water meter housing which is a unitary molding of a 30% glass reinforced polycarbonate material. The spud 16 is about 0.630" in length, with an 0.850" O.D. and has recesses 22 and 24 of shapes and dimensions similar to the protuberances on the sleeve 12 such that sleeve 12 and spud 16 can be mated and snapped together as described. As best seen in FIG. 2, the internal surface of the spud generally defines a regular hexagon in cross section with the flat sides beneath the recesses 24, and with a seventh flat surface set inwardly beneath recess 22, to provide added material in these areas for strength. This inner surface is 0.625" across the rounded corners of the hexagon and 0.573" across the internal flat surfaces. The end walls 32 of the staggered recesses 24 are spaced, alternately, 0.109" and 0.262" from end surface 26, while the surfaces 48 of the corresponding wedges 44 are spaced 0.097" and 0.250", respectively, from the end surface 36.

FIG. 6 illustrates an alternative number and geometrical distribution of the locking splines, wedges and respective recesses. In this embodiment, corresponding components are given numbers in the 100 series, corresponding to the numbers used in describing the embodiment of FIGS. 1–5. In the assembly of FIG. 6, two keyways 122 are located on opposite sides of the spud 116, and the sleeve 112 is provided with a pair of diametrically opposed, axially extending ribs 140 which have sliding mating engagement with the recesses 122. Spud 116 is formed with four locking recesses 124 positioned at 90° intervals about the spud in circumferentially staggered relation to the keyways 122. Correspondingly, sleeve 112 is formed with four locking wedges 144 which are spaced 90° apart and positioned relative to ribs 140 and outward distal face 136 similar to the positions of the locking recesses 124 relative to keyways 122 and distal face 126.

It will be appreciated, particularly by those skilled in the art, that many modifications and variations may be made from the embodiments shown and described without departing from the spirit and scope of the invention. By way of an example, certain alternatives have been noted. Moreover, the features for mating sliding snap engagement disclosed herein could be applied on opposite surfaces such that the protuberances would be placed upon the male portion and the recesses on the female portion, or any combination with both recesses and protuberances on each member. While the specific preferred embodiments are of a joint for a meter housing, it will be understood that the threaded connector also could be applied to other types of members wherein a threaded connection is to be made and for either external or internal threads. The spline connection for effecting the antirotational features may be obtained with other mating configurations, including a variety of polygonal cross sections. Moreover, while the illustrated and described longitudinal locking protuberances and recesses between the threaded sleeve and the housing end represent the preferred embodiment, other specific configurations may be devised for accomplishing the same end. Similarly, while specific materials are set forth in this application alternate materials and combinations of materials can be substituted and will work satisfactorily so long as the essential properties, such as strength and elasticity are maintained. A nut with a tapering thread may be used for squeezing the sleeve toward the spud. A sealant material such as pipe joint compound or other sealing arrangements may be effected in place of the washer between the abutting joint surfaces and may be desirable for specific applications.

It will be appreciated that improvements have been provided which meet the aforestated objects.

While there has been shown and described certain preferred embodiments of the present invention, it will be apparent to those skilled in the art that further changes and modifications may be made without departing from the invention in its broader aspects. It is, therefore, contemplated in the appended claims to cover all such changes and modifications as fall within the true spirit and scope of the present invention.

What is claimed is:

1. A connector assembly having replaceable prefabricated threads comprising a first prefabricated member including an end section having a peripheral surface extending inward from the distal end thereof parallel to a longitudinal axis of said end section, and a replaceable prefabricated interlocking second member having exposed threads extending inwardly thereof from its outward end for threaded engagement of a mating element with said assembly, said second prefabricated member having inner and outer surfaces, one of said surfaces of said second member being threaded to provide said exposed threads, the other of said surfaces of said second member being of a size and configuration designed for axial sliding mating engagement with said peripheral surface of said first member inward from said distal end, and each of said members including preformed locking portions extending from the respective engagement surface, said preformed locking portions of said members being of complementary configurations to mechanically interengage with one another upon such axial sliding mating engagement of said second member with said peripheral surface of said first member, said preformed portions including portions of said members which interfere with one another circumferentially of said members for preventing rotary movement of said second member relative to said first member after such mating engagement therebetween, and said preformed portions including a protuberance on a mating surface of one of said members, said protuberance having a leading cam surface and a rear abutment surface, and the other of said members being formed with a recess in the respective mating surface of a configuration to receive said protuberance and having an abutment surface at one end of said recess for engagement by said abutment surface of said protuberance to prevent axial sliding disassembly of said members, and one of said members being resilient to permit temporary deformation of said member to permit said protuberance to override the opposing surface by cam action therewith and to snap into such recess during assembly for preventing axial removal of said threaded member outward of said distal end after such mating engagement therebetween, whereby said threaded surface is exposed for rotary threading engagement of a mating element with said second member inward from said outward end and said second member is secured on said end section by said interengaging portions for such rotary engagement and for transferring axial stress from said second member to said first member.

2. A connector assembly as in claim 1 wherein said preformed locking portions include complementary non-cylindrical portions extending axially of said members.

3. A connector assembly as in claim 2 wherein said peripheral surface of said first member is an outer peripheral surface thereof, said second member being a sleeve member slidably engageable over said first member, and said threaded surface of said second member being the outer surface thereof.

4. A connector assembly as in claim 1 wherein at least a part of said preformed locking portions interfere with one another upon axial sliding mating assembly of said first and second members, said second member being resilient to permit flexure thereof for passage of said last-mentioned portions past one another during such assembly of said members, and said last-mentioned portions thereafter engaging one another to preclude axial sliding disassembly of said members.

5. A connector assembly as in claim 1 wherein said peripheral surface of said first member is an outer peripheral surface thereof, said second member being a sleeve member slidably engageable over said first member, said threaded surface of said second member being the outer surface thereof, said outer surface of said first member and said inner surface of said second member including said locking portions which fit with one another upon axial sliding mating assembly of said first and second members, said second member being resilient to permit flexure thereof for passage of said axial abutment portions past one another during such assembly of said members, and said last-mentioned portions thereafter engaging one another to preclude axial sliding disassembly of said members.

6. A connector assembly having replaceable prefabricated threads comprising a first prefabricated member including an end portion having a peripheral surface extending inward from the distal end thereof parallel to the longitudinal axis of said end portion and a unitary replaceable prefabricated interlocking second member having exposed threads extending inward thereof from its outward end for threaded engagement of a mating element with said assembly, said second prefabricated member comprising a sleeve having inner and outer surfaces, one of said surfaces of said sleeve being threaded to provide such exposed threads, the other of said surfaces of said sleeve being of a size and configuration designed for axial sliding mating engagement with said peripheral surface of said first member inward from said distal end, whereby such mating engagement surfaces of said members comprise an outwardly disposed surface on one of said members and an inwardly disposed surface on the other of said members, said one of said members having preformed locking recesses in said outwardly disposed surface, said other of said members including preformed locking protuberances extending radially inwardly from said inwardly disposed surface and of complementary configuration relative to said recesses for mechanically interengaging with said recesses upon such axial sliding mating engagement of said members, said preformed recesses and protuberances including surface portions which abut one another circumferentially of said members for preventing rotary movement of said second member relative to said first member after such mating engagement therebetween and surface portions which abut one another axially of said members for preventing axial removal of said sleeve outward of said distal end portion after such mating engagement therebetween, said members including ramp means for radial displacement of said axial abutment protuberances onto said outwardly disposed surface by cam action during axial sliding mating engagement of said members, and at least one of said members being resilient to permit flexure thereof for passage of the axial abutment protuberances onto said outwardly disposed surface and subsequent entry of such protuberances into the respective recesses as said members are so assembled without permanent deformation of either member, whereby said threaded surface of said sleeve is exposed for securement of a mating threaded element by rotary threading engagement of said element with said threaded sleeve inwardly from said outward end and said threaded sleeve is locked on said end portion by such engagement of said protuberances in said recesses for such rotary engagement and for transferring axial stress from said sleeve to said end portion.

7. A connector assembly as in claim 6 wherein said ramp means comprise ramp surfaces on said axial abutment protuberances.

8. A connector assembly as in claim 7 wherein said recesses and protuberances include an elongated spline means disposed on said members for cooperative mating mechanical engagement in spline-like fashion to restrain rotary motion of said sleeve about said end portion, and camming protuberances and complementary recesses for cooperating snap engagement to prevent outward axial translation of said sleeve with respect to said end portion.

9. A connector assembly as in claim 8 wherein said spline means comprises an elongated axially extending rib-like member disposed on said inwardly disposed surface and a corresponding groove disposed on said outwardly disposed surface for cooperative mating mechanical engagement in spline-like fashion to restrain rotary motion of said sleeve about said end portion.

10. A connector assembly as in claim 6 wherein said peripheral surface of said end portion is the outer surface thereof and is of a predetermined outer diameter, said sleeve having an inner diameter substantially equal to the outer diameter of said end portion whereby said sleeve fits about said end portion by axial sliding movement onto said end portion from the distal end thereof, the outer surface of said sleeve having threads, the outer surface of said end portion and the inner surface of said threaded sleeve including said preformed locking protuberances and recesses which mechanically interengage with one another.

11. A connector assembly as in claim 10 wherein said first prefabricated member has a central fluid passageway extending therethrough and said end portion includes an end fluid passageway extending therethrough, said central and said end fluid passageways communicating with one another.

12. A connector assembly as in claim 11 wherein said first member is a main housing of a water meter assembly.

13. A water meter housing assembly including a main housing having a central fluid passageway extending therethrough and an end portion of predetermined outer diameter extending from said housing and including an end fluid passageway extending therethrough, said central and end passageways communicating with one another, and a resilient cylindrical sleeve having an inner diameter substantially equal to the outer diameter of said end portion for axial slideable mating engagement of said sleeve over said end portion, the outer surface of said sleeve having threads, the outer surface of said end portion and the inner portion of said threaded sleeve including preformed locking portions which mechanically interengage with one another upon such axial sliding mating engagement therebetween, said preformed locking portions comprising an elongated axially extending rib-like member disposed on the inner surface of said sleeve and a corresponding groove in said end portion for cooperative mating mechanical engagement in spline-like fashion to restrain rotary motion of said sleeve about said end portion when so assembled thereon, and a plurality of recesses in said end portion and camming means on said sleeve, said camming means having ramps which extend radially inward to a lesser extent near the end of said sleeve which is during assembly first engaged on said end portion and which extend radially inwardly to a greater extent near the end of said sleeve which is after assembly furthest from said main housing for cooperating snap engagement with said recesses for preventing outward axial translation of said sleeve relative to said end portion after such assembly thereon, whereby said sleeve fits about said end portion by axial sliding movement onto said end portion from the distal end without permanent deformation of said housing or sleeve and said threaded surface of said sleeve is thereafter exposed for securement of a mating threaded element to said water meter by rotary threading application of said element onto said threaded sleeve inwardly from said distal end, and said threaded sleeve is locked on said end portion by said preformed locking portions for such rotary application and for transferring axial stress from said sleeve to said end portion.

14. A water meter housing assembly as in claim 13 wherein said housing includes a radially extending part where said end portion joins said housing for limiting inward axial movement of said sleeve with respect to said end portion.

15. A water meter housing assembly as in claim 13 wherein said sleeve is formed of a resilient material whereby it may be temporarily flexed for the requisite snap locking during assembly.

16. A water meter housing assembly as in claim 15 wherein said sleeve is a polymeric substance and said housing is a glass reinforced polymeric material.

* * * * *